United States Patent Office 3,008,954
Patented Nov. 14, 1961

3,008,954
PROCESS FOR OBTAINING AN ISOQUINUCLI-
DINE ALKALOID FROM CONOPHARYNGIA
SPECIES
Ulrich Renner and Daniel A. Prins, Riehen, Switzerland, assignors to Geigy Chemical Corporation, Ardsley, N.Y., a corporation of Delaware
No Drawing. Filed July 27, 1959, Ser. No. 829,547
Claims priority, application Switzerland Aug. 8, 1958
7 Claims. (Cl. 260—236)

The present invention relates to new processes for obtaining a purified amorphous alkaloid fraction from plants of the genus Conopharyngia (Apocynaceae). Furthermore, it relates to a new process for obtaining the crystalline alkaloid tabernanthine from said purified amorphous alkaloid fraction from plants of the genus Conopharyngia.

Plants of the genus Conopharyngia are common to the tropical zone of Africa. Specific representatives of said genus are, e.g. *C. durissima, C. chippii, C. longiflora, C. cuminsii, C. contorta, C. brachyantha, C. penduliflora, C. johnstonii* and *C. usambarensis*. Heretofore, they have primarily been of botanical interest. No chemical investigation of their constituents is recorded, and more specifically, no record exists of the isolation of pure alkaloids from said plants.

It is an object of the present invention to provide a purified amorphous alkaloid fraction from plants of the genus Conopharyngia, in particular from *Conopharyngia durissima* Stapf. Said purified amorphous alkaloid fraction is pharmacologically active. For example, it has analgesic, anti-inflammatory and sedative properties, and it is antagonistic to the action of serotonin. Therefore, it can be used, e.g. for the treatment of painful conditions and inflammatory diseases. Said purified amorphous alkaloid fraction, however, cannot be induced to crystallize, either per se or from solution.

It is, therefore, another object of the present invention to provide a simple process whereby such purified amorphous alkaloid fraction is rendered suitable for crystallization, the crystalline product obtained being the alkaloid tabernanthine, first isolated from *Tabernanthe iboga* Bn., a species of the genus Tabernanthe, and described by Delourme-Houdé, Ann. Pharm. Franç. 4, 30 (1946). Tabernanthine is valuable because of its hypotensive action (Delourme-Houdé, l.c.) and because of its stimulating action on the central nervous system. Up to now, however, it has been found in nature in quantities too small to permit its further development. By virtue of its preparation according to the process of the present invention it has become much more readily accessible.

It has now been found that the purified amorphous alkaloid fraction from plants of the genus Conopharyngia can be produced according to the present invention as follows: parts of Conopharyngia, advantageously of *Conopharyngia durissima* Stapf, and in particular the root and bark thereof, are (a) extracted with methanol, the methanolic extract is concentrated to a fraction (e.g. ⅐–⅒) of its original volume, (b) any solid matter precipitated during the operation is removed by filtration, centrifugation or decantation, (c) the remaining clear solution is acidified to a pH value between 2.5 and 4 by addition of dilute lower fatty acid, preferably formic, acetic or propionic acid, and particularly 1–3 N acetic acid, (d) the resulting aqueous acid solution of a pH between 2.5 and 4 is again clarified by filtration, centrifugation or decantation, (e) subsequently extracted first with low molecular weight alkanes, preferably with petroleum ether and then (f) with a lower aliphatic, halogenated hydrocarbon, preferably chloroform, methylene chloride, ethylene dichloride, trichlorethane, trichloroethylene or dichloroethylene, or with another water-immiscible solvent, preferably with ethyl ether or ethyl acetate. The latter extract is (g) concentrated to a fraction (e.g. ⅔) of its original volume, (h) washed with an aqueous alkaline solution, e.g. with a solution of sodium carbonate, sodium hydroxide or with ammonia, (i) and evaporated to dryness; (k) the residue is triturated with benzene or a mixture of benzene and petroleum ether (containing up to 50% petroleum ether), (l) the resulting solution filtered through an adsorbent, preferably through activated aluminum oxide, and (m) the filtrate evaporated to dryness, the residue thus obtained constituting the purified amorphous alkaloid fraction.

In order to render the purified amorphous alkaloid fraction according to the invention suitable for crystallization, it is (n) heated in an alkaline medium, in particular in lower alkanolic, preferably methanolic, ethanolic or propanolic solution of an alkali metal hydroxide, preferably sodium or potassium hydroxide, (o) the lower alkanol removed in vacuo, (p) the residue dissolved in such an amount of aqueous mineral acid, preferably hydrochloric, sulfuric or phosphoric acid, as to attain a solution having a pH value between 4 and 1, in particular a pH of about 2, (q) the solution subsequently warmed to 20–100° C., advantageously to 70–80° C.; (r) the solution is then made alkaline by the addition of a base, preferably ammonia, sodium carbonate, potassium carbonate, sodium hydroxide or potassium hydroxide; (s) the resulting precipitates separated by filtration or extraction with an organic water-immiscible solvent, advantageously benzene, ethyl ether or ethyl acetate, and a pure alkaloid obtained from either the filtration or extraction residue by (t) crystallization from a lower alkanol, advantageously methanol, ethanol, propanol or isopropanol. The pure alkaloid melts at 205–207° C., and has the formula $C_{20}H_{26}N_2O$ according to the following analysis:

|   | calculated | found |
|---|---|---|
| C | 77.38 | 77.46 |
| H | 8.44 | 8.34 |
| N | 9.03 | 9.14 |

This alkaloid proved to be identical with the isoquinuclidine alkaloid tabernanthine as can be seen from a comparison of the physical data of the two substances.

|   | M.P., °C. | $[\alpha]_D$ | U.V. spectrum |
|---|---|---|---|
| Pure alkaloid from *Conopharyngia durissima* Stapf | 205–7 | −41° (acetone) | max. 227.5; 270; 299 m$\mu$. min. 255; 282.5 m$\mu$ (methanol) |
| Tabernanthine [1] | 209 | −40° (acetone) | max. 270; 300 m$\mu$. min. 257.5; 280 m$\mu$. |

[1] T. A. Henry, "The Plant Alkaloids," 4th ed., J. & A. Churchill, Ltd., London, 1949, page 768.

In contrast to the present technically feasible processes it has been found that the alkaloid tabernanthine cannot be obtained in crystalline form from Conopharyngia species, in particular not from *Conopharyngia durissima* Stapf, by application of mere separation techniques, e.g. adsorption and/or partition chromatography, or countercurrent distribution, or combinations thereof, which techniques would moreover be considerably more costly.

A modified, simpler process for the manufacture of the purified amorphous alkaloid fraction consists in (i) adjusting the pH of the acid aqueous solution, preferably the acetic acid solution, obtained after step (e) hereinbefore described, to a value of 3, and then (ii) extracting with benzene, (iii) washing the benzene extract with an aqueous alkaline solution, e.g. sodium carbonate solution, (iv) drying and concentrating the benzene solution (e.g. to ½ of original volume), then following steps (*l*) and (*m*) hereinbefore described, whereby the purified amphorous alkaloid fraction is obtained.

According to yet another particularly valuable modification of the process for the manufacture of the purified amorphous alkaloid fraction, the defatted, clarified acid solution, preferably the acetic acid solution obtained after step (*e*) described above, is (1) extracted with benzene, ethyl ether or a mixture thereof containing up to 50% ether, (2) the extract is evaporated to dryness, (3) the residue taken up in dilute, preferably 1–2 N acetic acid, (4) the resulting solution saturated with an alkali halide, preferably sodium or potassium bromide or iodide, (5) any resulting precipitate removed, and (6) the clear solution basified, for example and preferably with ammonia, sodium carbonate, potassium carbonate, sodium hydroxide or potassium hydroxide, whereby the purified amorphous alkaloid fraction is precipitated. (7) It may be collected by filtration or extraction with an organic solvent, for example with benzene, ethyl ether, ethyl acetate, methylenechloride or chloroform.

It is expressly stated herewith that any of the operations of filtration, centrifugation or decantation, or filtration and extraction, as mentioned e.g. in the steps (*b*), (*d*), (*s*) and (7) may be used interchangeably without impairing any of the beneficial characteristics of the processes or of the products obtainable therefrom.

The following examples set forth methods of carrying out the present invention, but it is to be understood that modifications may be made in carrying out this invention without departing from the spirit and scope thereof.

*Example 1*

3000 parts of the ground root bark of *Conopharyngia durissima* Stapf are percolated with about 30,000 parts by volume of methanol. The extract is concentrated in vacuo to 1000 parts by volume, 40–45 parts of insoluble precipitate are removed by filtration and the filtrate is stirred into 3000 parts of 2 N acetic acid. After decantation from insoluble matter, the aqueous acid solution is extracted with three portions of 1500 parts each of petroleum ether, whereby 18–20 parts of impurities are removed. The remaining acid, aqueous phase, which has a pH of about 4, is then extracted with 5 portions of 1000 parts each of chloroform, the chloroform solution is concentrated to 2000 parts, washed with 2 N sodium carbonate solution, dried, e.g. over sodium sulfate, and evaporated to dryness. The residue of 28–30 parts is extracted with 2000–2500 parts of benzene, and the solution filtered over 500–700 parts of neutral aluminum oxide of activity grade II according to Brockmann. The benzene filtrate is evaporated to dryness, leaving the purified amorphous alkaloid fraction in a yield of 3 to 6 parts depending on the quality of the plant material used.

*Example 2*

The aqueous acid phase according to Example 1, having a pH of about 4, remaining after petroleum ether extraction, is adjusted to pH 3 by the addition of 5 N hydrochloric acid and extracted with 3 portions of 1500 parts each of benzene. The benzene extract is washed with 2 N sodium carbonate solution, dried over sodium sulfate, concentrated to about 2000 parts, and the remaining solution filtered over aluminum oxide and evaporated to dryness according to Example 1, thus yielding the purified amorphous alkaloid fraction in essentially the same yield.

*Example 3*

8500 parts of ground root of *Conopharyngia durissima* Stapf are extracted with three portions of 10,000 parts each of methanol, the marc removed, the liquors combined and concentrated in vacuo to 4000 parts. The residue is filtered, whereby 100–200 parts of insoluble material are removed. The filtrate is further concentrated to 1000 parts and 3000 parts of 10% (v./v.) aqueous acetic acid are added. The resulting solution is filtered through a filter aid, e.g. hyflo, and the pH of the filtrate adjusted to a value of 3.0 with 5 N hydrochloric acid. The aqueous liquor is then extracted twice with 1500 parts of petroleum ether, and thereafter with three portions of 2000 parts each of benzene. The petroleum ether extract is discarded; the combined benzene extracts are evaporated to dryness, leaving a residue of about 20 to 30 parts. This is dissolved in 200 parts of 10% (v./v.) acetic acid, and to the resulting solution are added about 200 parts by volume of an aqueous saturated potassium bromide solution. The precipitate is filtered off, and the filtrate saved. The filter cake is dissolved in about 200 parts of 5% (v./v.) aqueous acetic acid, reprecipitated by the addition of 200 parts by volume of an aqueous saturated potassium bromide solution, and the precipitate removed by filtration. To the combined filtrates ammonia is added until phenolphthalein turns red, the bases thus precipicated are collected by filtration, the filter cake washed with water and dried, yielding 5–10 parts of purified amorphous alkaloid fraction.

*Example 4*

25 parts of purified amorphous alkaloid fraction obtained according to the processes described in Examples 1 to 3, and 400 parts of 20% (v./v.) methanolic potassium hydroxide solution are kept under reflux for 6 hours, whereupon the solvent is removed in vacuo. The residue is taken up in aqueous hydrochloric acid, the final pH being 2, and the solution kept at 80° for 3 hours. Animal charcoal is added to the hot solution, which is filtered and basified with ammonia. The bases which have precipitated are collected by filtration and crystallized from methanol, yielding 6–8 parts of tabernanthine as colourless crystals of M.P. 205–207° C.

What we claim is:

1. Process for the manufacture of tabernanthine from plant species of the genus Conopharyngia comprising the preparation of a purified amorphous alkaloid fraction by (*a*) totally extracting parts from said plant species with methanol, (*b*) separating the concentrated methanolic total extract from insoluble material contained therein, (*c*) acidifying the clear methanolic solution so obtained with dilute lower fatty acid selected from the group consisting of formic, acetic and propionic acid to a pH value between 2.5 and 4, (*d*) separating insoluble material contained in the acidified methanolic solution, (*e*) extracting the clear solution with petroleum ether, (*f*) extracting the remaining aqueous phase with a solvent selected from the group consisting of chloroform, methylene chloride, ethylene dichloride, trichlorethane, trichloroethylene, dichloroethylene, ethyl ether and ethyl acetate, (*g*) concentrating the solvent extract so obtained, (*h*) washing the concentrated extract with aqueous inorganic alkaline solution, (*i*) evaporating the washed concentrated extract to dryness, (*k*) triturating the substantially dry residue with a solvent selected from the group consisting of benzene and mixtures of benzene and petroleum ether containing petroleum ether up to 50% by volume, (*l*) filtering the extract so obtained through activated aluminum oxide, (*m*) evaporating the filtrate to dryness, the so obtained substantially dry residue being said purified amorphous alkaloid fraction, (*n*) heating said fraction with an alkali metal hydroxide selected from the group consisting of sodium and potassium hydroxide in a lower alkanol selected from the group consisting of methanol, ethanol and propanol, (*o*) distilling off the lower alkanol in vacuo, (*p*) dissolving the residue in aqueous mineral acid selected from the group consisting of hydrochloric, sulfuric and phosphoric acid, (*q*) warming the acid solution at a pH between 4 and 1 to a temperature between 70 and 80° C., (*r*) adjusting the pH to alkalinity by addition of a base selected from the group consisting of ammonia, sodium carbonate, potassium carbonate, sodium hydroxide and potassium hydroxide, (s) separating the precipitated tabernanthine and (t) crystallizing said tabernanthine from a lower alkanol selected from the group consisting of methanol, ethanol, propanol and isopropanol.

2. Process for the manufacture of an amorphous alkaloid fraction from which tabernanthine is recoverable in crystalline form, which comprises (a) totally extracting parts from plant species of the genus Conopharyngia with methanol, (b) separating the concentrated methanolic total extract from insoluble material contained therein, (c) acidifying the clear methanolic solution so obtained with dilute lower fatty acid selected from the group consisting of formic, acetic and propionic acid to a pH value between 2.5 and 4, (d) separating insoluble material contained in the acidified methanolic solution, (e) extracting the clear solution with petroleum ether, (f) extracting the remaining aqueous phase with a solvent selected from the group consisting of chloroform, methylene chloride, ethylene dichloride, trichlorethane, trichloroethylene, dichloroethylene, ethyl ether and ethyl acetate, (g) concentrating the solvent extract so obtained, (h) washing the concentrated extract with aqueous inorganic alkaline solution, (i) evaporating the washed concentrated extract to dryness, (k) triturating the substantially dry residue with a solvent selected from the group consisting of benzene and mixtures of benzene and petroleum ether containing petroleum ether up to 50% by volume, (l) filtering the extract so obtained through activated aluminum oxide, and (m) evaporating the filtrate to dryness, the so obtained substantially dry residue being said amorphous fraction.

3. Process for the manufacture of an amorphous alkaloid fraction from which tabernanthine is recoverable in crystalline form, which comprises (a) totally extracting parts from plant species of the genus Conopharyngia with methanol, (b) separating the concentrated methanolic total extract from insoluble material contained therein, (c) acidifying the clear methanolic solution so obtained with dilute lower fatty acid selected from the group consisting of formic, acetic and propionic acid to a pH value between 2.5 and 4, (d) separating insoluble material contained in the acidified methanolic solution, and (e) extracting the clear solution with petroleum ether, and thereafter adjusting the pH value of the remaining acid aqueous phase to pH=3, extracting the resultant solution with benzene, washing the benzene extract with aqueous alkaline solution, drying and concentrating the washed benzene extract, filtering the extract so obtained through activated aluminum oxide, and evaporating the filtrate to dryness, the so obtained substantially dry residue being said amorphous fraction.

4. Process for the manufacture of an amorphous alkaloid fraction from which tabernanthine is recoverable in crystalline form, which comprises (a) totally extracting parts from plant species of the genus Conopharyngia with methanol, (b) separating the concentrated methanolic total extract from insoluble material contained therein, (c) acidifying the clear methanolic solution so obtained with dilute lower fatty acid selected from the group consisting of formic, acetic and propionic acid to a pH value between 2.5 and 4, (d) separating insoluble material contained in the acidified methanolic solution, and (e) extracting the clear solution with petroleum ether, and thereafter extracting the remaining acid aqueous phase with a solvent selected from the group consisting of benzene, ethyl ether and mixtures thereof containing ethyl ether up to 50% by volume, evaporating the solvent extract to dryness, dissolving the substantially dry residue in acetic acid having a normality between 1 and 2, saturating the solution so obtained with an alkali metal halide selected from the group consisting of sodium bromide, potassium bromide, sodium iodide and potassium iodide, separating insoluble material contained in said saturated solution, adjusting the clear solution to alkalinity by addition of a base selected from the group consisting of ammonia, sodium carbonate, potassium carbonate, sodium hydroxide and potassium hydroxide, and separating the so obtained precipitated purified amorphous alkaloid fraction.

5. Process for the recovery of crystalline tabernanthine from the amorphous alkaloid fraction obtained according to claim 2, which comprises heating said fraction with an alkali metal hydroxide selected from the group consisting of sodium and potassium hydroxide in a lower alkanol selected from the group consisting of methanol, ethanol and propanol, distilling off the lower alkanol in vacuo, dissolving the residue in aqueous mineral acid selected from the group consisting of hydrochloric, sulfuric and phosphoric acid, warming the acid solution at a pH between 4 and 1 to a temperature between 70 and 80° C., adjusting the pH to alkalinity by addition of a base selected from the group consisting of ammonia, sodium carbonate, potassium carbonate, sodium hydroxide and potassium hydroxide, separating the precipitated tabernanthine, and crystallizing said tabernanthine from a lower alkanol selected from the group consisting of methanol, ethanol, propanol and isopropanol.

6. Process for the recovery of crystalline tabernanthine from the amorphous alkaloid fraction obtained according to claim 3, which comprises heating said fraction with an alkali metal hydroxide selected from the group consisting of sodium and potassium hydroxide in a lower alkanol selected from the group consisting of methanol, ethanol and propanol, distilling off the lower alkanol in vacuo, dissolving the residue in aqueous mineral acid selected from the group consisting of hydrochloric, sulfuric and phosphoric acid, warming the acid solution at a pH between 4 and 1 to a temperature between 70 and 80° C., adjusting the pH to alkalinity by addition of a base selected from the group consisting of ammonia, sodium carbonate, potassium carbonate, sodium hydroxide and potassium hydroxide, separating the precipitated tabernanthine, and crystallizing said tabernanthine from a lower alkanol selected from the group consisting of methanol, ethanol, propanol and isopropanol.

7. Process for the recovery of crystalline tabernanthine from the amorphous alkaloid fraction obtained according to claim 4, which comprises heating said fraction with an alkali metal hydroxide selected from the group consisting of sodium and potassium hydroxide in a lower alkanol selected from the group consisting of methanol, ethanol and propanol, distilling off the lower alkanol in vacuo, dissolving the residue in aqueous mineral acid selected from the group consisting of hydrochloric, sulfuric and phosphoric acid, warming the acid solution at a pH between 4 and 1 to a temperature between 70 and 80° C., adjusting the pH to alkalinity by addition of a base selected from the group consisting of ammonia, sodium carbonate, potassium carbonate, sodium hydroxide and potassium hydroxide, separating the precipitated tabernanthine, and crystallizing said tabernanthine from a lower alkanol selected from the group consisting of methanol, ethanol, propanol and isopropanol.

References Cited in the file of this patent

UNITED STATES PATENTS 2,823,204    Janot    Feb. 11, 1958

FOREIGN PATENTS 479,946    Canada    Jan. 1, 1952

OTHER REFERENCES

Delourme-Houdé: Ann. Pharm. Franç., vol. 4, page 30 (1946).

Henry: The Plant Alkaloids, 4th Edition, pages 768–9, The Blakiston Co., Philadelphia (1949).

Dickel et al.: Jour. Amer. Chem. Soc., vol. 80 (January 5, 1958), pages 123–125.